United States Patent [19]

Lemke et al.

[11] 4,316,227
[45] Feb. 16, 1982

[54] MULTITRACK MAGNETIC HEAD EMPLOYING DOUBLE HELIX STRUCTURE

[75] Inventors: James U. Lemke, Del Mar; William W. French, Cardiff-by-the-Sea, both of Calif.

[73] Assignee: Eastman Technology, Inc., Rochester, N.Y.

[21] Appl. No.: 83,036

[22] Filed: Oct. 9, 1979

[51] Int. Cl.³ .......................... G11B 5/27; G11B 5/20; G11B 5/12

[52] U.S. Cl. ..................................... 360/121; 29/603; 360/122; 360/123; 360/125

[58] Field of Search ............... 360/121, 122, 123, 125, 360/126–127, 119, 110; 336/178, 184; 29/603

[56] References Cited

U.S. PATENT DOCUMENTS

| | | | |
|---|---|---|---|
| 2,754,569 | 7/1956 | Kornei | 360/110 |
| 3,535,466 | 10/1970 | Foster | 360/125 |
| 3,550,150 | 12/1970 | Gardner et al. | 360/125 |
| 3,723,665 | 3/1973 | Lazzari et al. | 360/123 |

OTHER PUBLICATIONS

IBM Tech. Disc. Bull., A. C. Thorpe et al., Multi--Channel Magnetic Recording Head, vol. 3, No. 10, Mar. 1961, p. 32.
IBM Tech. Disc. Bull., J. A. Golaski et al., Magnetic Head, vol. 19, No. 8, Jan. 1977, p. 2927.
IBM Tech. Disc. Bull., K. R. Grebe, Batch Fabricated Tape Heads, vol. 10, No. 4, Sep. 1967, p. 364.

*Primary Examiner*—Alfred H. Eddleman
*Attorney, Agent, or Firm*—Robert F. Cody

[57] ABSTRACT

A multitrack magnetic head is made from an electrically conductive first helix formed on an iron wire that is, in turn, wound to form a second helix. By cutting or lapping a longitudinal flat along one side of the second helix, the first helix is severed into respective discrete coil-wound gapped cores.

11 Claims, 12 Drawing Figures

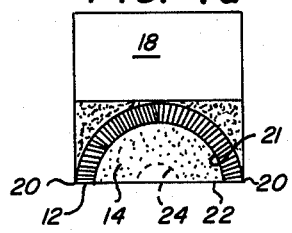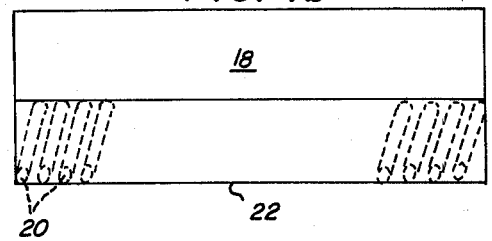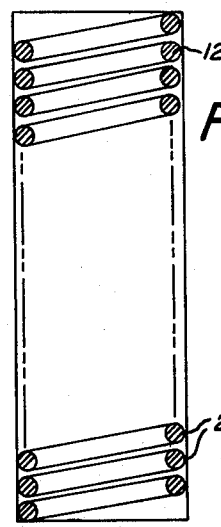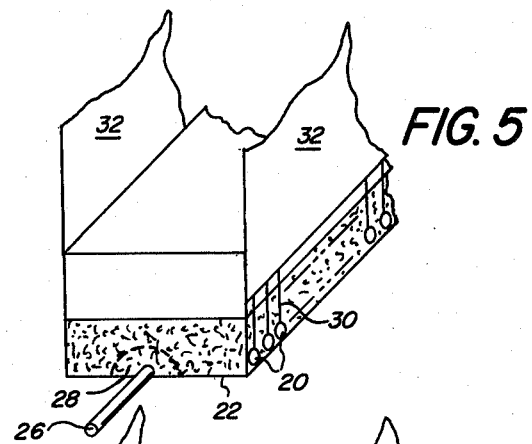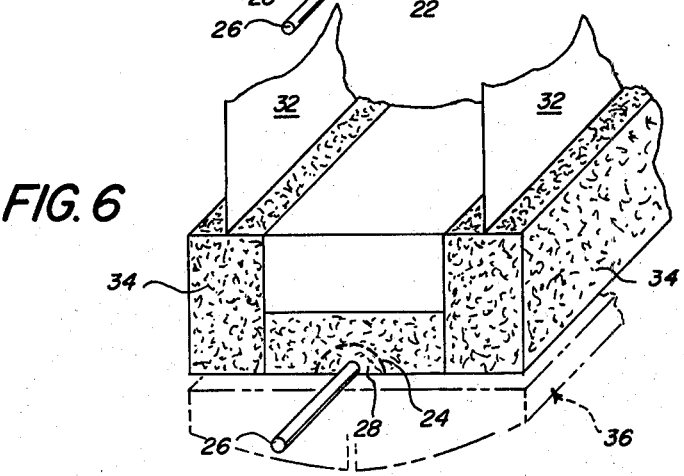

MULTITRACK MAGNETIC HEAD EMPLOYING DOUBLE HELIX STRUCTURE

BACKGROUND OF THE INVENTION

1. Field of the Invention

This invention relates in general to multitrack magnetic heads and to methods and parts for forming such heads.

2. Description Relative to the Prior Art

In the art of magnetic recording, there is a trend toward the use of multitrack magnetic heads having large numbers of cores per unit width across the head surface that interacts with the recording medium. One explanation for this trend may be found in the fact that a plurality of head cores can record a specific amount of data at an information writing speed which is only about 1/number of active cores of the information writing speed which would be required when writing with only one core. For example, for a playback gap length of, say, $100\mu''$ ($\mu''$=microinch, a bandwidth of 2 mHz would necessitate a single core writing speed of 200 inches per second (ips) if use of the recording medium is to be obtained. By contrast (still using playback gap lengths of $100\mu''$), that same bandwidth of 2 mHz can be written by a 500-track record head at a relative head-to-medium speed of only 0.4 ips (i.e., $(2\times 10^6/500)\times 100\times 10^{-6} = 0.4$ ips). Such recording of a large bandwidth in a large number of tracks at low writing speed suggests, among other things, the linear tape recording of video information. Linear tape recording of video information, as opposed to the recording techniques employed in helical scan and quadruplex video recorders, implies a simplification of hardware: not only does a lessened information writing speed relax the mechanical demands of the recording operation, but head switching, rotary head drums, and various electronics are obviated, as well.

Perhaps the most common technique for forming a multitrack magnetic head is that which is shown generally in U.S. Pat. No. 4,084,199. Such a technique is characterized by the respective winding of coils on discrete cores, and the positioning of the coil-supporting cores in thin slots in a head block. Because of the tedium inherent in the winding of coils on tiny cores, and because of the brittleness associated with the slotting of the head block, a head made according to the teaching of U.S. Pat. No. 4,084,199 is generally limited to about 30 tracks per widthwise inch of the recording medium. In an attempt to increase the number and density of discrete cores in a multitrack magnetic head, various head manufacturing techniques employing photolithography have been suggested, thereby to avoid the need for discrete coil winding and to avoid the requirement for sawing thin slots in a head block. U.S. Pat. Nos. 3,893,189 and 3,983,622 are representative of such techniques.

While photolithography and similar techniques hold promise for future developments in the art of multitrack magnetic heads, it must, however, be realized that such techniques have limited versatility when it comes to providing multitrack magnetic heads of varying design. It would, for example, be desirable to have a multitrack magnetic head which is such that, when made from a basic core material, variations in the resultant head design can be provided relatively easily, and without ado. In other words, were it desired, for example, to provide a multitrack magnetic head of N cores with M turns per core, or a multitrack magnetic head of X cores with Y turns per core, such could be provided handily from the same basic core material.

Copending U.S. patent application Ser. No. 82,847 discloses an invention in which a double helix core-and-coil structure is provided, the preselectable length of such double helix core-and-coil structure being determinant of the number of cores which are to be employed in a head under construction. One helix of the double helix core-and-coil structure constitutes an electrically conductive coil wrapped on a magnetic wire; and which magnetic wire is, itself, helically wound to form the second helix of the double helix core-and-coil structure. By longitudinally cutting through one side of the double helix core-and-coil structure, a succession of gapped cores is provided; and by judiciously contacting the electrically conductive helix, supported by the magnetic helix, at a predetermined arc of the magnetic helix, the number of turns of the coils in question may be selected. (The term "gap", as used herein, does not necessarily mean "transducer gap". Rather, "gap" shall be interpreted to mean any break in an otherwise continuous form, and which break may or may not constitute a "transducer gap".)

As taught in U.S. patent application Ser. No. 82,847, the double helix core-and-coil structure is formed on a removable mandrel; and which mandrel is removed during head manufacture to permit the inherent helical twists in the gapped cores to be cancelled by relatively shifting the core parts which define the respective core gaps. Such a procedure, according to the present invention, may be eliminated, thereby to produce a multitrack head which is not only easier to make, but which is structurally better... and which, when worn out, will provide an expensive-to-build part for the "reconstruction" of a new head.

SUMMARY OF THE INVENTION

In accordance with the present invention, the double helix core-and-coil structure which is formed on a mandrel is processed to provide the mandrel-supported structure with a flat. In so providing the flat, the double helix core-and-coil structure is converted into a succession of individual coil-wound cores, each of which has a helical twist therein. Rather than remove such twists, as taught in copending U.S. patent application Ser. No. 82,847, the present invention teaches the use of a cooperative pole tip piece comprising a plurality of pole tip pairs, such pole tip pairs defining a gap line, and being skewed relative to the gap line in proportion to the core twists, thereby to compensate for such core twists. Because the double helix core-and-coil structure remains on its mandrel during and after head manufacture, a head made as taught herein is inherently stronger than one made by the teaching of U.S. patent application Ser. No. 82,847. And, it will be appreciated, when the pole tip piece of a head made as taught herein wears out, it may be removed, the flat of the double helix core-and-coil structure reprocessed, and a new pole tip piece installed. Since the coil-supporting cores constitute the most intricate and expensive part of a head, the prior art discarding of such cores is, by means of the present invention, avoided.

The invention will be described with reference to the figures, wherein:

FIGS. 4a, 4b and 4c are, respectively, edge, side and bottom views depicting a flat formed in the double helix core-and-coil structure;

FIGS. 5 and 6 are perspective views showing parts of a head embodying the invention.

Figure 1:
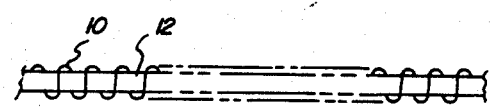
FIG. 1 is a side view showing one helix of the double helix core-and-coil structure.
Figure 2:
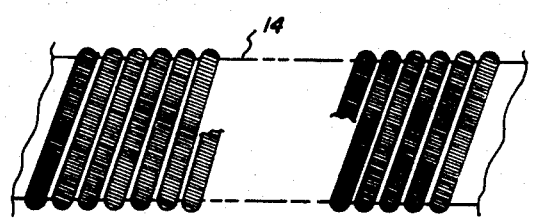
FIG. 2 is a side view showing the double helix core-and-coil structure.
Figure 3A:
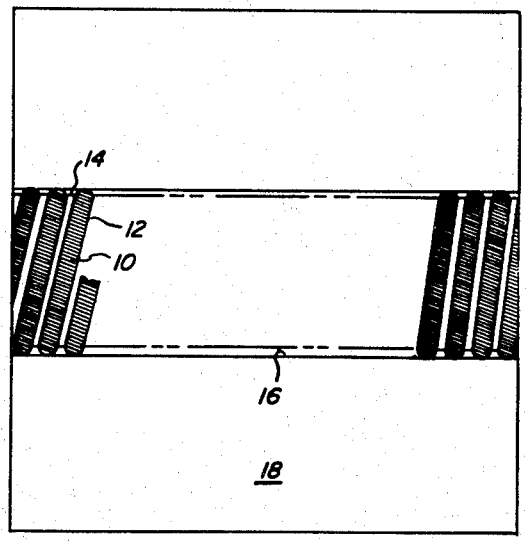
FIGS. 3a, 3b and 3c are, respectively, plan, edge and side views of apparatus employed in the practice of the invention.
Figure 3B:
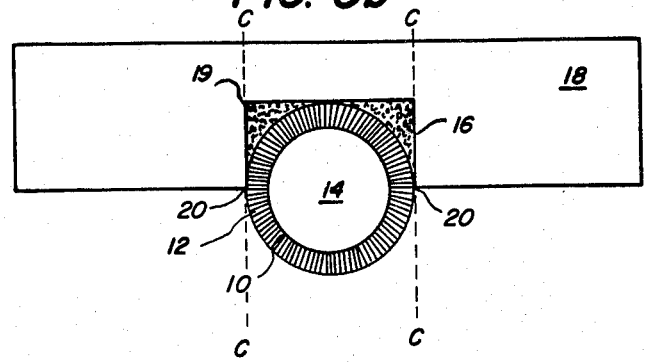
Figure 3C:
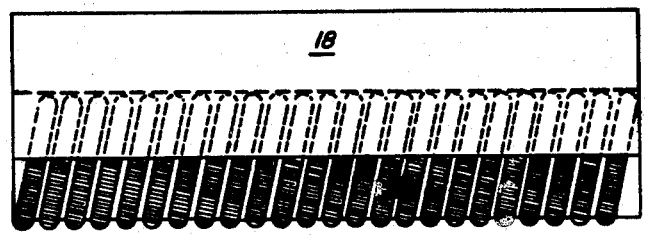

A multitrack magnetic head having 252 coil-wound cores per widthwise inch of the head, and which head embodies the invention, will now be described in terms of its method of manufacture:

Referring to FIG. 1, a very fine insulation-covered copper wire 10 (0.0009 inch in diameter) is helically wound into a coil along and about the length of an iron wire 12 (0.002 inch in diameter). Then, as depicted in FIG. 2, the coil-supporting iron wire 12 is, itself, helically wound on a mandrel 14, thereby forming the basic double helix core-and-coil structure. (It will be appreciated that the double helix core-and-coil structure may be provided, and stocked, in large spools and/or skeins thereof, whereby multitrack heads of various numbers of cores may be provided depending upon the length of the double helix core-and-coil structure which is employed.) The mandrel 14, which in this case has a circular cross-section of 0.002 inch in diameter, is then laid along the length of a groove 16 in a non-magnetic jig 18. See FIGS. 3a, 3b and 3c. After the double helix core-and-coil structure is bonded in place in the groove 16 by epoxy 19, parts of the jig 19 are cut or lapped away (see dashed lines c—c of FIG. 3b), thereby exposing rows of electrical contact points 20 to which electrical leads may be bonded. See FIGS. 4a, 4b and 4c. The double helix core-and-coil structure is then lapped to provide a flat 22 on the double helix core-and-coil structure, the flat 22 effectively converting the double helix core-and-coil structure into a row of helically twisted, individual, coil-wound cores 21. (It will be appreciated, as was described in copending U.S. patent application Ser. No. 82,847, that different numbers of turns on the individual cores may be provided, simply, by proper angling of the cut or lap lines c—c.) A channel 24 is then cut into the mandrel 14 to accommodate a common bias lead 26 (FIG. 5) for the cores 21, the lead 26 being bonded in place by suitable means 28. Leads 30 from ribbon cables 32 are then ball-bond soldered respectively to the electrical contact points 20; and, although it will be usual to bring leads 30 to all of the contact points 20, it will, of course, be possible to vary the number and density of the active cores 21 of the head under construction by selectively bonding leads to different ones of the contact points 20. (For example, if it is desired to provide a 126 track head, instead of a 252 track head, every other lead of the ribbon cables 32 is simply left opened.)

The ribbon cables 32 are then embedded in epoxy 34 (FIG. 6), thereby forming an integral structure of 'cores, coils and leads' . . . and which structure may be used over and over again with successive pole tip pieces.

Figure 7B:
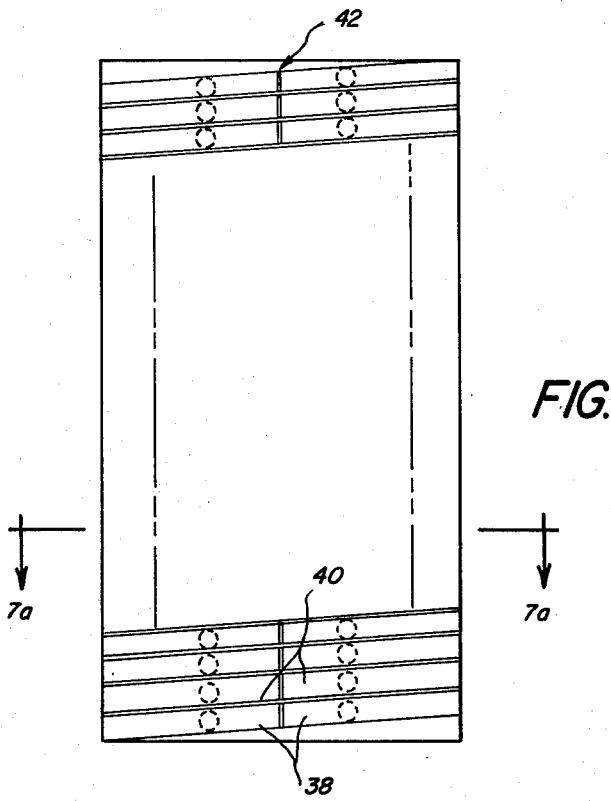
FIGS. 7a and 7b are side and plan views useful in describing a multitrack magnetic head embodying the invention.

In accordance with a principal aspect of this invention, a pole tip piece 36 (see FIGS. 7a and 7b) having individual magnetic pole tip pairs 38, 40, etc. which are skewed relative to a high reluctance gap line 42 (by an amount corresponding to the helical twists left in the cores 21) is then bonded at 43 to the integral structure of FIG. 6 in such a way that pole pairs mate with, and magnetically couple (as at 44) to, respective cores 21. This procedure obviates the need to untwist individual cores.

Figure 7A:
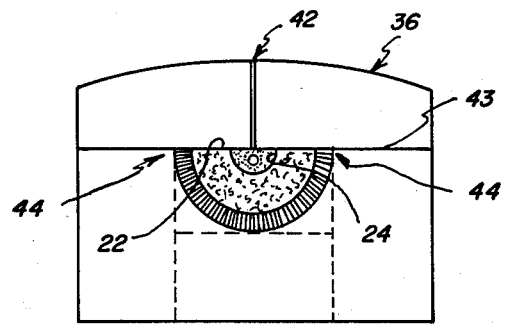

To replace a pole tip piece 36 which has worn out, the epoxy bond 43 of FIG. 7a is simply broken, the pole tip piece removed, and the flat 22 lapped clean to accommodate a new pole tip piece.

The invention has been described in detail with particular reference to certain preferred embodiments thereof, but it will be understood that variations and modifications can be effected within the spirit and scope of the invention.

What is claimed is:

1. A multitrack magnetic head comprising:
    (a) first and second discrete gapped cores each of which has respective first and second core poles, each of said cores being so twisted about a common axis that the core poles which define the core gaps are displaced with respect to each other along said axis, the core poles of said first core being separated from each other and disposed to reside in two different planes that are perpendicular to said axis, and the core poles of said second core being also separated from each other and disposed to reside in two different planes that are perpendicular to said axis; and
    (b) a pole tip piece comprising first and second pairs of pole tips which together define a high reluctance transducer gap line,
  said first pair of pole tips being in skewed relation with respect to said gap line and being magnetically coupled respectively via low reluctance paths to the poles of the first core, and
    the second pair of poles tips being also in skewed relation with respect to said gap line and being magnetically coupled respectively via low reluctance paths to the poles of the second core.

2. The multitrack magnetic head of claim 1 including a mandrel for supporting said first and second cores, said mandrel being provided with a flat which spatially coincides with the respective poles of said first and second cores.

3. The multitrack magnetic head of claim 2 including respective substantially helical first and second electrically conductive coils on the first and second cores of said head, each of said coils extending from one pole of its respective core to the other pole of that core.

4. The multitrack magnetic head of claim 1 including respective substantially helical first and second electrically conductive coils on the first and second cores of said head, each of said coils extending from one pole of its respective core to the other pole of that core.

5. An assembly for use in a multitrack magnetic head comprising:
    (a) first and second discrete gapped magnetic cores each of which has respective first and second core poles, each of said cores being so twisted about a common axis that the core poles which define the core gaps are displaced with respect to each other along said axis, the core poles of said first core being separated from each other and disposed to reside in two different planes that are perpendicular to said axis, and the core poles of said second core being also separated from each other and disposed to reside in two different planes that are perpendicular to said axis; and (b) a mandrel for supporting said cores, said mandrel being provided with a flat which spatially coincides with the respective poles of said first and second cores.

6. The assembly of claim 5 including respective substantially helical first and second electrically conductive coils on said first and second cores, each of said coils extending from one pole of its respective core to the other pole of that core.

7. A pole tip piece for use in a multitrack magnetic head comprising first and second pairs of pole tips having respective high reluctance gaps therebetween, the gaps of the two pole tips being similarly oriented and in alignment with a gap line, said pole tips being each provided with a medium contacting surface that is shaped like a parallelogram having dissimilar pairs of interior angles, whereby said pole tip pairs assume a skewed relation with respect to said gap line.

8. A multitrack magnetic head comprising:
(a) an elongated mandrel having a flat;
(b) a plurality of magnetic cores mounted to and along the length of said mandrel, said cores having respective pairs of poles which are coextensive with the flat of said mandrel, said pole pairs being such that one pole of a pole pair is axially displaced on the mandrel with respect to the other pole of that pole pair; and
(c) a pole tip piece comprised of a plurality of pole tip pairs, the pole tip pairs cooperating to define a gap line and being so disposed as to be in skewed relation to said gap line, the tips of the pole tip pairs being respectively adapted to be in low reluctance cooperation with respective poles of said cores.

9. The multitrack magnetic head of claim 8 including substantially helically wound electrically conductive coils on respective cores thereof, each said coil extending from a point coextensive with said flat to another point coextensive with said flat.

10. An assembly for use in a multitrack magnetic head comprising:
(a) an elongated mandrel having a flat; and
(b) a plurality of magnetic cores mounted to and along the length of said mandrel, said cores having respective pairs of poles which are coextensive with the flat of said mandrel, said pole pairs being such that one pole of a pole pair is axially displaced on the mandrel with respect to the other pole of that pole pair.

11. The assembly of claim 10 including substantially helically wound electrically conductive coils on respective cores thereof, each said coil extending from a point coextensive with said flat to another point coextensive with said flat.

* * * * *